(12) United States Patent
Takeo (10) Patent No.: US 9,145,655 B2
(45) Date of Patent: Sep. 29, 2015

(54) TURNING DRIVE DEVICE (71) Applicant: SUMITOMO(S.H.I.) CONSTRUCTION MACHINERY CO., LTD., Tokyo (JP)

(72) Inventor: Jitsutaka Takeo, Chiba (JP)

(73) Assignee: SUMITOMO(S.H.I.) CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 14/168,104

(22) Filed: Jan. 30, 2014

(65) Prior Publication Data
US 2014/0145657 A1    May 29, 2014

Related U.S. Application Data (63) Continuation of application No. PCT/JP2012/070020, filed on Aug. 6, 2012.

(30) Foreign Application Priority Data

Aug. 9, 2011    (JP) .................................. 2011-174400

(51) Int. Cl.
| H02H 7/08 | (2006.01) |
| H02K 29/08 | (2006.01) |
| E02F 9/12 | (2006.01) |
| E02F 9/20 | (2006.01) |
| H02P 6/12 | (2006.01) |
| E02F 9/26 | (2006.01) |
| E02F 9/24 | (2006.01) |

(52) U.S. Cl.
CPC ................. *E02F 9/123* (2013.01); *E02F 9/121* (2013.01); *E02F 9/128* (2013.01); *E02F 9/2095* (2013.01); *E02F 9/24* (2013.01); *E02F 9/268* (2013.01); *H02P 6/12* (2013.01); *B60L 2200/40* (2013.01)

(58) Field of Classification Search
USPC ......................................... 318/400.21, 400.39
See application file for complete search history.

(56) References Cited

U.S. PATENT DOCUMENTS

| 5,636,516 A * | 6/1997 | Kon ................................. 60/466 |
| 2006/0218916 A1* | 10/2006 | Ando et al. ...................... 60/473 |
| 2007/0273316 A1* | 11/2007 | Yoshimatsu et al. .......... 318/371 |

(Continued)

FOREIGN PATENT DOCUMENTS

| JP | 2005-082265 | 3/2005 |
| JP | 2009-155988 | 7/2009 |

(Continued)

OTHER PUBLICATIONS

International Search Report mailed on Nov. 20, 2012.

*Primary Examiner* — Erick Glass
(74) *Attorney, Agent, or Firm* — IPUSA, PLLC (57) ABSTRACT

A turning drive device is provided that converts power of an engine into electric power and turns a turning body using the converted electric power. The turning drive device includes an electrical energy storage unit that stores electrical energy, a turning motor that is driven by an electric power from the electrical energy storage unit and is configured to drive a turning body, an inverter that controls a drive operation of the turning motor, a controller that is connected to the inverter via a control signal line, and an emergency operation part that supplies a command to the inverter when an abnormality occurs in a control operation of the turning motor. The inverter blocks the control signal line based on a signal from the emergency operation part and controls the drive operation of the turning motor.

5 Claims, 7 Drawing Sheets (56) References Cited

U.S. PATENT DOCUMENTS

2010/0102763 A1* 4/2010 Kagoshima et al. .......... 318/380
2011/0264337 A1   10/2011 Takanashi et al.

FOREIGN PATENT DOCUMENTS

| JP | 2009-280973 | 12/2009 |
| WO | WO 2010/064625 | 6/2010 |

* cited by examiner

TURNING DRIVE DEVICE

RELATED APPLICATION

The present application is a continuation application filed under 35 U.S.C. 111(a) claiming benefit under 35 U.S.C. 120 and 365(c) of PCT International Application No. PCT/JP2012/070020 filed on Aug. 6, 2012 and designating the U.S., which claims priority to Japanese Patent Application No. 2011-174400 filed on Aug. 9, 2011. The entire contents of the foregoing applications are incorporated herein by reference.

BACKGROUND

1. Technical Field

The present invention relates to a turning drive device for driving a turning body arranged at a construction machine and similar machinery.

2. Description of Related Art

Construction machines such as excavators generally include a drive device for driving a turning body to which a work element such as a bucket is mounted. For example, in an excavator, a bucket corresponding to a work element may be mounted to an upper turning body where a cabin is arranged so that the bucket may turn along with the turning motion of the upper turning body. In this way, the bucket may be turned around the excavator and moved to a desired position where work is to be performed. The excavator includes a turning mechanism for driving and turning the upper turning body.

Such a turning mechanism may use a turning motor as a drive source. Power supply to the tuning motor is controlled by an inverter. The inverter is controlled by a controller that controls overall operations of the drive mechanism of the excavator. When an abnormality occurs at the controller itself or within a control signal line between the inverter and the controller, the controller may no longer be able to control the inverter, and as a result, normal drive operations of the turning mechanism may become impossible.

In this respect, a technique is known in which a subordinate control unit (e.g., inverter) monitors a superordinate control unit (e.g., controller) for an abnormality, and the subordinate control unit, upon detecting an abnormality in the superordinate control unit, controls the drive device.

SUMMARY

According to one embodiment of the present invention, a turning drive device is provided that converts power of an engine into electric power and turns a turning body using the converted electric power. The turning drive device includes an electrical energy storage unit that stores electrical energy, a turning motor that is driven by an electric power from the electrical energy storage unit and is configured to drive a turning body, an inverter that controls a drive operation of the turning motor, a controller that is connected to the inverter via a control signal line, and an emergency operation part that supplies a command to the inverter when an abnormality occurs in a control operation of the turning motor. The inverter blocks the control signal line based on a signal from the emergency operation part and controls the drive operation of the turning motor.

DETAILED DESCRIPTION

In an excavator that uses a turning mechanism including a turning motor, when an abnormality occurs at a controller or a control signal line between the controller and an inverter, drive operations of the turning mechanism may be stopped as a measure for responding to the abnormality.

However, in the case where the drive operations of the drive mechanism are stopped, it becomes impossible to change the turning position of the upper turning body. For example, the bucket may be fixed to the position it is placed when the drive operations of the drive mechanism is stopped. In this case, for example, the bucket may interfere with other operations that are to be performed at the work site. In other examples, when the upper turning body or the bucket is fixed in place at the stop position, the excavator may be left in an unstable state due to an imbalanced positioning of the bucket or the upper turning body, for example.

In light of the above, there is a demand for a turning drive device that is capable of temporarily turning the upper turning body through an alternative control operation other than a normal control operation even when an abnormality occurs at a controller or a control signal line between the controller and an inverter.

According to one embodiment of the present invention, a turning drive device is provided that converts power of an engine into electric power and turns a turning body using the converted electric power. The turning drive device includes an electrical energy storage unit that stores electrical energy, a turning motor that is driven by an electric power from the electrical energy storage unit and is configured to drive a turning body, an inverter that controls a drive operation of the turning motor, a controller that is connected to the inverter via a control signal line, and an emergency operation part that supplies a command to the inverter when an abnormality occurs in a control operation of the turning motor. The inverter blocks the control signal line based on a signal from the emergency operation part and controls the drive operation of the turning motor.

According to an aspect of the present invention, even when the turning motor cannot be driven by normal control operations due to an abnormality of the controller or the control signal line, the turning motor may be driven by a control operation of the inverter based on a signal from the emergency operation part. Thus, even when normal control operations cannot be performed due to the occurrence of an abnormality, the turning body driven by the turning motor may still be turned and moved to a desired position.

In the following, embodiments of the present invention are described with reference to the accompanying drawings.

Figure 1:
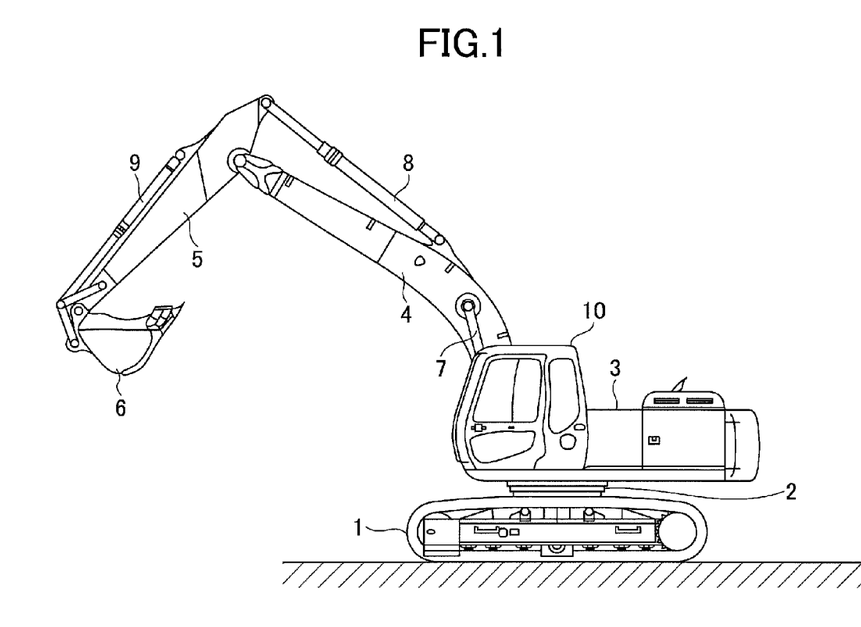
FIG. 1 is a side view of a hybrid excavator.

FIG. 1 is a side view of a hybrid excavator in which an embodiment of the present invention may be implemented.

An upper turning body 3 is mounted, via a turning mechanism 2, on the lower running body 1 of the hybrid excavator illustrated in FIG. 1. A boom 4 is attached to the upper turning body 3. An arm 5 is attached at the end of the boom 4. A bucket 6 is attached at the end of the arm 5. The boom 4, the arm 5, and the bucket 6 are hydraulically driven by a boom cylinder 7, an arm cylinder 8, and a bucket cylinder 9, respectively. A cabin 10 is arranged in the upper turning body 3, and a power source, such as an engine, is mounted to the upper turning body 3.

Figure 2:
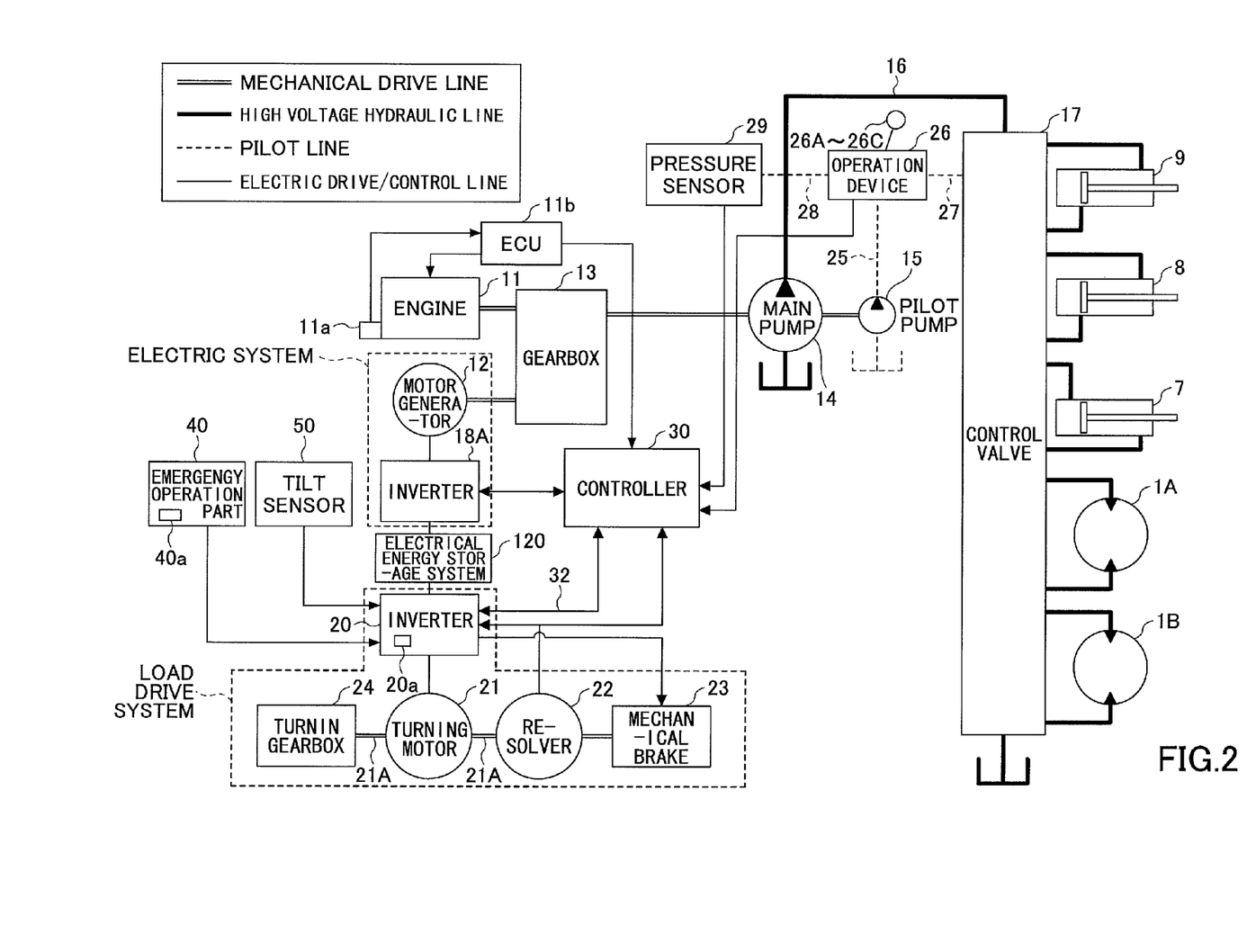
FIG. 2 is a block diagram illustrating a configuration of a drive system of a hybrid excavator according to one exemplary embodiment.

FIG. 2 is a block diagram showing a configuration of a drive system of the hybrid excavator illustrated in FIG. 1. In FIG. 2, the double line denotes a mechanical drive line, the thick solid line denotes a high voltage hydraulic line, the dotted line denotes a pilot line, and the thin solid line denotes an electric drive/control line.

An engine 11 as a mechanical drive part and a motor generator 12 as an assist drive part are connected to two input axes of a gearbox 13, respectively. A main pump 14 as a hydraulic pump and a pilot pump 15 are connected to the output axis of the gearbox 13. A control valve 17 is connected to the main pump 14 via a high voltage hydraulic line 16. The hydraulic pump 14 corresponds to a variable displacement hydraulic pump that is capable of controlling a fluid flow rate by controlling the angle (tilt angle) of a swash-plate to adjust a piston stroke length.

The engine 11 includes an engine rotation speed detection unit 11a for detecting the rotation speed of the engine 11. The engine rotation speed detected by the engine rotation speed detection unit 11a is input to an engine control unit (ECU) 11b. The ECU 11b performs feedback control of the engine 11 based on the detected engine rotation speed. Also, the ECU 11b transmits the detected engine rotation speed to a controller 30, which is described below.

The control valve 17 is a control unit that controls a hydraulic system of the hybrid excavator. A hydraulic motor 1A (for the right side) and a hydraulic motor 1B (for the left side) are provided for driving the lower running body 1. The hydraulic motors 1A and 1B, the boom cylinder 7, the arm cylinder 8, and the bucket cylinder 9 are connected to the control valve 17 via the high voltage hydraulic line.

An electrical energy storage system (electrical energy storage unit) 120 including an electrical energy storage device is connected to the motor generator 12 via an inverter 18A. An operation device 26 is connected to the pilot pump 15 via the pilot line 25. The operation device 26 includes a lever 26A, a lever 26B, and a pedal 26C. The lever 26A, the lever 26B, and the pedal 26C are connected to each of the control valve 17 and a pressure sensor 29 via a hydraulic line 27 and a hydraulic line 28, respectively. The pressure sensor 29 is connected to the controller 30, which performs drive control of an electric system.

The turning mechanism 2 of the hybrid excavator illustrated in FIG. 2 is electrically-driven, and a turning motor 21 is provided for driving the turning mechanism 2. The turning motor 21 as an electric work element is connected to the electrical energy storage system 120 via an inverter 20. A resolver 22, a mechanical brake 23, and a turning gearbox 24 are connected to the axis of rotation 21A of the turning motor 21. The turning motor 21, the inverter 20, the resolver 22, the mechanical brake 23, and the turning gearbox 24 comprise a load drive system.

The controller 30 corresponds to a control unit that acts as a main control part performing drive control of the hybrid excavator. The controller 30 includes a processor unit including a CPU (central processing unit) and an internal memory. The functions of the controller 30 are implemented by the CPU executing a drive control program stored in the internal memory.

The controller 30 converts a signal received from the pressure sensor 29 into a speed command, and performs drive control of the turning motor 21 using the speed command. The signal received from the pressure sensor 29 is equivalent to the signal indicating the operational amount when the operation device 26 is operated to turn the turning mechanism 2.

The controller 30 controls operation of the motor generator 12 (switching of a motor-assisted operation and a power generating operation), and controls operation of the up-down voltage converter 100 (see FIG. 3) as the voltage raising/lowering control unit to control charging/discharging of the capacitor 19. The controller 30 controls switching of the voltage raising operation and the voltage lowering operation of the up-down voltage converter 100 based on the charge state of the capacitor 19, the operating state of the motor generator 12 (motor-assisted operation or power generating operation) and the operating state (power operation or regeneration operation) of the turning motor 21, so that the charging/discharging of the capacitor 19 is controlled. Also, the controller 30 calculates a charge rate SOC of an electrical energy storage device (capacitor) based on an electrical energy storage device voltage value detected by an electrical energy storage device voltage detection part.

The controller 30 is connected to the inverter 20 via a control signal line 32 and is configured to transmit a control signal to the inverter 20 via the control signal line 32. In embodiments described below, the inverter 20 is capable of controlling a drive current being supplied to the turning motor 21 and controlling operations of the mechanical brake 23. Also, a detection value representing a tilt angle detected by a tilt sensor 50 is supplied to the inverter 20. The tilt sensor 50 is for detecting the tilt angle of the excavator. When the tilt angle is large and the upper turning body 3 is turned in a direction that involves turning a work element in the upward direction, a greater amount of turning force is required compared to the case where the turning direction is substantially horizontal. When the tilt angle is large and the upper turning body 3 is turned in a direction that involves turning a work element in a downward direction, a smaller amount of turning force is required compared to a case where the turning direction is substantially horizontal.

Further, the resolver 22 detects the rotation speed of the turning motor 21 and transmits the detection value to the controller 30 and the inverter 20. Thus, the inverter 20 may obtained the turning speed of the upper turning body 3 based on the detection value from the resolver 22.

Figure 3:
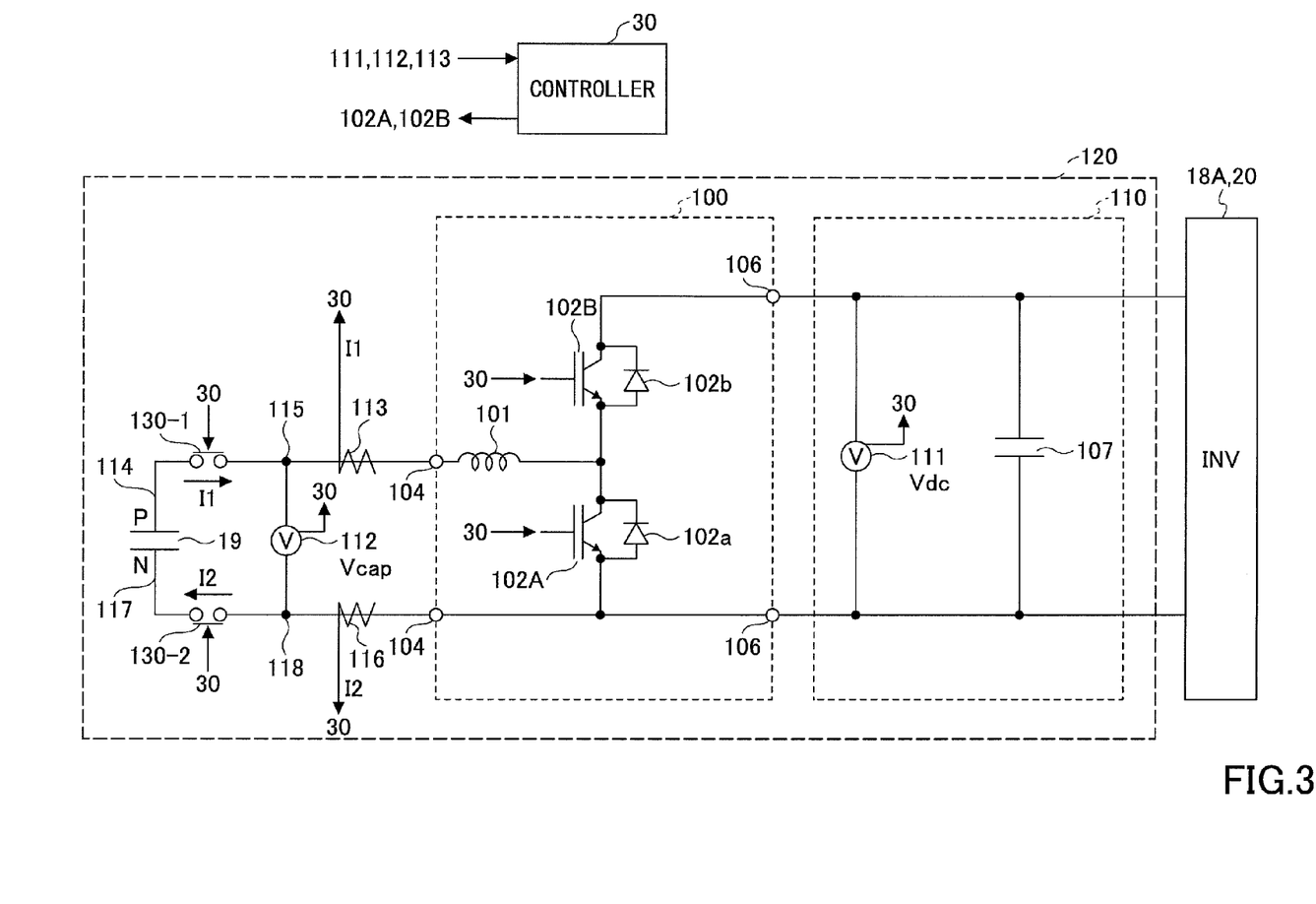
FIG. 3 is a circuit diagram of an electrical energy storage system.

FIG. 3 is a block diagram illustrating a configuration of the electrical energy storage system 120. The electrical energy storage system 120 includes a capacitor 19 as an electrical energy storage device, an up-down voltage converter 100, and a DC bus 110. The DC bus 110 controls transfer of electric power between the capacitor 19, the motor generator 12, and the turning motor 21. A capacitor voltage detection part 112 for detecting a capacitor voltage value and a capacitor current detection part 113 for detecting a capacitor current value are arranged at the capacitor 19. The capacitor voltage value and the capacitor current value detected by the capacitor voltage detection part 112 and the capacitor current detection part 113 are supplied to the controller 30.

The up-down voltage converter 100 controls switching between a voltage raising operation and a voltage lowering operation according to the operating states of the motor generator 12 and the turning motor 21 so that the DC bus voltage value falls within a certain range. The DC bus 110 is arranged between the inverters 18A and 20 and the up-down voltage converter 100, and is configured to transfer electric power between the capacitor 19, the motor generator 12, and the turning motor 21.

The switching control between the voltage raising operation and the voltage lowering operation of the up-down voltage converter 100 is carried out based on the DC bus voltage value detected by the DC bus voltage detection part 111, the capacitor voltage value detected by the capacitor voltage detection part 112, and the capacitor current value detected by the capacitor current detection part 113.

In the above-described configuration, the power generated by the motor generator 12 corresponding to an assist motor is supplied to the DC bus 110 of the electrical energy storage system 120 via the inverter 18A, and supplied to the capacitor 19 via the up-down voltage converter 100. The regeneration power obtained by the regeneration operation of the turning motor 21 is supplied to the DC bus 110 of the electrical energy storage system 120 via the inverter 20, and supplied to the capacitor 19 via the up-down voltage converter 100.

The up-down voltage converter 100 includes a reactor 101, a voltage raising IGBT (insulated gate bipolar transistor) 102A, a voltage lowering IGBT 102B, a pair of power supply connection terminals 104 for connecting the capacitor 19, a pair of output terminals 106 for connecting the DC bus 110, and a smoothing capacitor 107 connected in parallel to the output terminals 106. The DC bus 110 is connected between the output terminals 106 of the up-down voltage converter 100 and the inverters 18A and 20.

One end of the reactor 101 is connected to the midpoint of the voltage raising IGBT 102A and the voltage lowering IGBT 102B, and the other end of the reactor 101 is connected to one of the power supply connection terminals 104. The reactor 101 is arranged to supply an induced electromotive force that is generated upon switching ON/OFF the voltage raising IGBT 102A to the DC bus 110.

Each of the voltage raising IGBT 102A and the voltage lowering IGBT 102B is formed by a bipolar transistor in which a MOSFET (metal oxide semiconductor field effect transistor) is incorporated in the gate portion. Each of the voltage raising IGBT 102A and the voltage lowering IGBT 102B is a semiconductor element (switching element) that is capable of switching large electric power at high speed. Each of the voltage raising IGBT 102A and the voltage lowering IGBT 102B is driven by the controller 30 supplying a PWM voltage to the gate terminal. A diode 102$a$ and a diode 102$b$, which are rectifier elements, are connected in parallel to the voltage raising IGBT 102A and the voltage lowering IGBT 102B, respectively.

The capacitor 19 may be a chargeable and dischargeable capacitor that enables transfer of electric power between the capacitor 19 and the DC bus 110 via the up-down voltage converter 100. It is noted that although the capacitor 19 is illustrated as an example of the first electrical energy storage part in FIG. 3, a chargeable and dischargeable secondary battery, such as a lithium ion battery, a lithium ion capacitor, or some other form of power supply that can deliver and receive electric power may be used instead of the capacitor 19.

The power supply connection terminals 104 and the output terminals 106 are terminals to which the capacitor 19 and the DC bus 110 are connected. The capacitor voltage detection part 112 for detecting the capacitor voltage value is connected between the power supply connection terminals 104. The DC bus voltage detection part 111 for detecting the DC bus voltage value is connected between the output terminals 106.

The capacitor voltage detection part 112 detects a voltage value Vcap of the capacitor 19. The DC bus voltage detection part 111 detects a voltage value Vdc of the DC bus 110. The smoothing capacitor 107 is an electrical energy storage element that is inserted between the positive-electrode terminal and the negative-electrode terminal of the output terminals 106 and is configured to smooth the DC bus voltage. The voltage of the DC bus 110 is maintained at a predetermined voltage by the smoothing capacitor 107.

The capacitor current detection part 113 is a detection part for detecting the value of the current that flows through the capacitor 19 at a positive-electrode terminal (P terminal) side of the capacitor 19. The capacitor current detection part 113 includes a resistor for current detection. The capacitor current detection part 113 detects a current value I1 of the current flowing through the positive terminal of the capacitor 19. On the other hand, a capacitor current detection part 116 is a detection part for detecting the value of the current that flows through the capacitor 19 at a negative-electrode terminal (N terminal) side of the capacitor 19. The capacitor current detection part 116 includes a resistor for current detection. The capacitor current detection part 116 detects a current value 12 of the current flowing through the negative terminal of the capacitor 19.

When raising the voltage of the DC bus 110 by the up-down voltage converter 100, the PWM voltage is supplied to the gate terminal of the voltage raising IGBT 102A, and the induced electromotive force generated at the reactor 101 in response to switching ON/OFF the voltage raising IGBT 102A is supplied to the DC bus 110 through the diode 102$b$ connected in parallel to the voltage lowering IGBT 102B. Thereby, the voltage of the DC bus 110 is increased.

When lowering the voltage of the DC bus 110 by the up-down voltage converter 100, the PWM voltage is supplied to the gate terminal of the voltage lowering IGBT 102B, and the regeneration power supplied via the voltage lowering IGBT 102B and the inverters 18A and 20 is supplied from the DC bus 110 to the capacitor 19. In this way, the capacitor 19 is charged by the power stored in the DC bus 110 and the voltage of the DC bus 110 is lowered.

In the present embodiment, a power supply line 114 connects the positive-electrode terminal of the capacitor 19 to the power supply connection terminal 104, and a relay 130-1 that acts as a breaker for blocking the power supply line 114 is arranged at the power supply line 114. The relay 130-1 is arranged between a connection point 115 of the capacitor voltage detecting part 112 to the power supply line 114 and the positive-electrode terminal of the capacitor 19. The relay 130-1 is operated by a signal from the controller 30 and is capable of cutting off the capacitor 19 from the up-down voltage converter 100 by blocking connection of the power supply line 114 to the capacitor 19.

Also, a power supply line 117 connects the negative-electrode terminal of the capacitor 19 to the power supply connection terminal 104, and a relay 130-2 that acts as a breaker for blocking the power supply line 117 is arranged at the power supply line 117. The relay 130-2 is arranged between a connection point 118 of the capacitor voltage detecting part 112 to the power supply line 117 and the negative-electrode terminal of the capacitor 19. The relay 130-2 is operated by a signal from the controller 30 and is capable of cutting off the capacitor 19 from the up-down voltage converter 100 by blocking connection of the power supply line 117 to the capacitor 19. Note that in an alternative embodiment, the relays 130-1 and 130-2 may be a single relay that simultaneously blocks both the positive-electrode terminal side power supply line 114 and the negative-electrode terminal side power supply line 117 to cut off the capacitor 19 from the up-down voltage converter 100.

Note that in practical applications, a drive part that generates a PWM signal for driving the voltage raising IGBT 102A and the voltage lowering IGBT 102B is arranged between the controller 30 and each of the voltage raising IGBT 102A and the voltage lowering IGBT 102B. However, the illustration of the drive part is omitted in FIG. 3. Such a drive part may be implemented by either an electronic circuit or a processor unit.

In the excavator having the above-described configuration, when an abnormality occurs at the controller 30, control operations by the controller 30 are stopped so that overall operations of the excavator may be stopped. In such a case, it may become impossible to control the turning motor 21 to turn around the upper turning body 3 and the turning motor 21 may thus remain at a standstill. Similarly, when an abnormality occurs at the control signal line 32 between the controller 30 and the inverter 20, it may become impossible to control the turning motor 21 to turn around the upper turning body 3.

In one embodiment of the present invention, even in an emergency caused by the occurrence of an abnormality such as that described above, a control operation may be switched from a normal control operation to an alternative control operation to drive the turning motor 21 to turn around the upper turning body 3 to a desired position. To implement such a measure, in the present embodiment, control of the inverter 20, which controls and drives the turning motor 21, is separated from the controller 30.

In the present embodiment, an emergency operation part 40 that may be operated by an operator of the excavator, for example, is provided in the cabin 10. The emergency operation part 40 includes a number of switches that may be operated by the operator to supply a signal for driving the turning motor 21 to the inverter 20.

Figure 4:
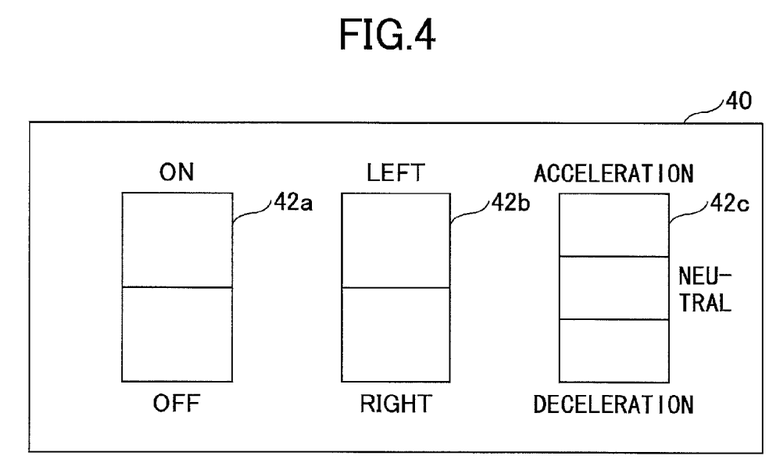
FIG. 4 is a plan view illustrating an example of an emergency operation part.

FIG. 4 is a plan view illustrating an example of the emergency operation part 40. The emergency operation part 40 illustrated in FIG. 4 includes an ON-OFF switch 42a, a turning direction switching switch 42b, and an acceleration/deceleration switching switch 42c.

The ON-OFF switch 42a is normally turned OFF. The ON-OFF switch 42a may be turned ON by the operator during an emergency where the controller 30 is unable to control the inverter 20, for example. When the ON-OFF switch 42a is turned ON, an emergency control signal is supplied to the inverter 20. In this way, communication between the inverter 20 and the controller 30 may be blocked, and an operation of the inverter 20 may be switched to being controlled by a signal from the emergency operation part 40.

The turning direction switching switch 42b is a switch for selecting the turning direction of the turning motor 21. When the turning direction switching switch 42b is switched to the "left," a command signal for driving the turning motor 21 to turn the upper turning body 3 in the left direction as viewed from the operator is transmitted to the inverter 20. Based on such a command signal, the inverter 20 supplies a predetermined drive current to the turning motor 21. On the other hand, when the turning direction switching switch 42b is switched to the "right," a command signal for driving the turning motor 21 to turn the upper turning body 3 in the right direction as viewed from the operator is transmitted to the inverter 20. Based on such a command signal, the inverter 20 supplies a predetermined drive current to the turning motor 21.

The acceleration/deceleration switching switch 42c is for selectively supplying a command signal for accelerating, a command signal for moving at a constant speed, or a command signal for decelerating to the inverter 20. When the acceleration/deceleration switching switch 42c is switched to the position of "acceleration," a command signal for accelerating the turning motor 21 is transmitted to the inverter 20. Based on such a command signal, the inverter 20 increases the drive current being supplied to the turning motor 21 to accelerate the turning motor 21. When the acceleration/deceleration switching switch 42c is switched to the position of "neutral," a command signal for having the turning motor 21 operate at no-load (drive output of zero) is transmitted to the inverter 20. Based on such a command signal, the inverter 20 sets the drive current being supplied to zero. The upper turning body 3 gradually decelerates due to friction resistance at various parts. When the acceleration/deceleration switching switch 42c is switched to the position of "deceleration," a command signal for decelerating the turning motor 21 is transmitted to the inverter 20. Based on such a command signal, the inverter 20 drives the turning motor 21 to act as a generator and decelerates the turning motor 21 using a regeneration brake.

According to an aspect of the present embodiment, even in a case where an abnormality occurs at the controller 30 such that the turning motor 21 cannot be controlled by the controller 30, the ON-OFF switch 42a, the turning direction switching switch 42b, and the acceleration/deceleration switching switch 42c may be operated in the manner described above to drive the turning motor 21 to turn the upper turning body 3.

Figure 5:
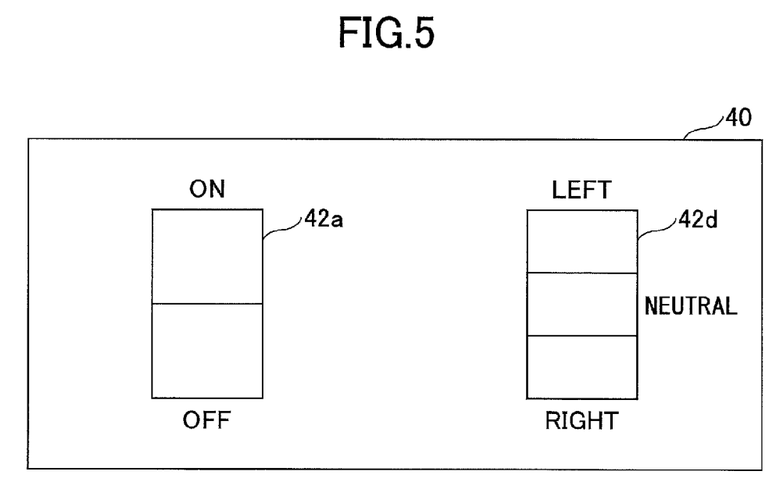
FIG. 5 is a plan view illustrating another example of the emergency operation unit.

The configuration of the switches of the emergency operation part 40 is not limited to that illustrated in FIG. 4, but may be in various other forms. FIG. 5 is a plan view illustrating another example of the emergency operation part 40. The emergency operation part 40 illustrated in FIG. 5 includes the ON-OFF switch 42a as described above and a drive switch 42d.

The drive switch 42d may be selectively switched to three different positions; namely, "left," "neutral," and "right." When the drive switch 42d is switched to the "left" position, a command signal for driving the turning motor 21 to turn the upper turning body 3 in the left direction as viewed from the operator is transmitted to the inverter 20. When the drive switch 42d is switched to the "neutral" position, a command signal for stopping the turning motor 21 to thereby stop the upper turning body 3 is transmitted to the inverter 20. When the drive switch 42d is switched to the "right" position, a command signal for driving the turning motor 21 to turn the upper turning body 3 in the right direction as viewed from the operator is transmitted to the inverter 20. The drive switch 42d is configured to be switched by being pushed in the left and right directions with respect to the "neutral" position arranged in the middle. That is, operation of the drive switch 42d may be similar to the operation of an operation lever for turning the upper turning body 3 under normal circumstances so that the operator may be able to operate the drive switch 42d with ease.

In the case where an abnormality occurs at the control signal line 32 between the controller 30 and the inverter 20, the controller 30 is capable of performing normal control operations. Thus, the power for driving the turning motor 21 may be supplied from both the capacitor 19 and the motor generator 12. Also, even in the case where an abnormality occurs at the controller 30, at least the ECU 11b may be free from the effects of the abnormality, and thus, the motor generator 12 may be operated by the power of the engine 11.

Figure 6:
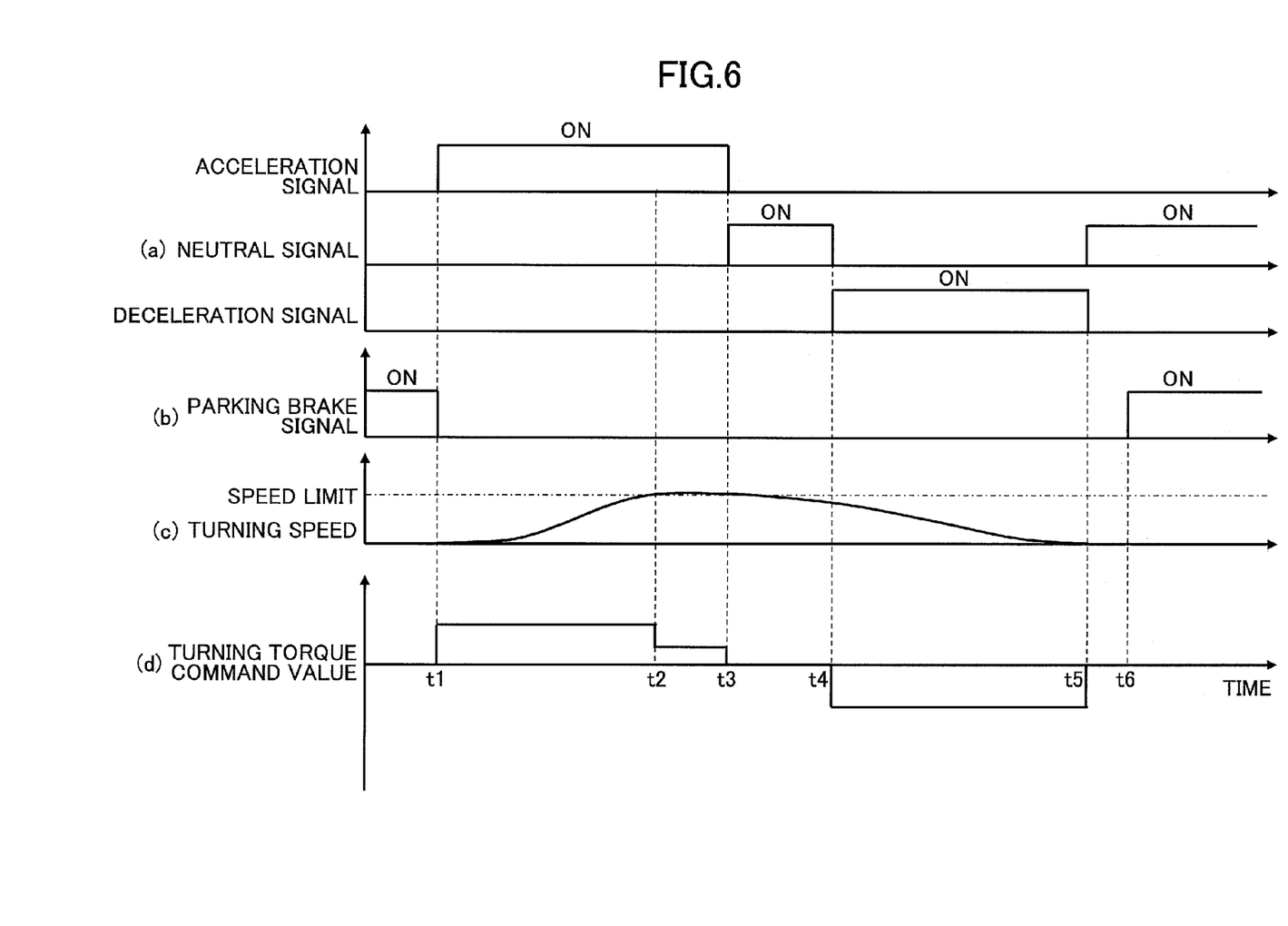
FIG. 6 is a time chart illustrating a change in each control element in one exemplary case of turning an upper turning body.

In the following, changes in control elements are described in a case where the upper turning body 3 is turned by operating the emergency operation part 40. FIG. 6 is a time chart illustrating a change in each control element in an exemplary case where the upper turning element 3 is turned by operating the emergency operation part 40. The example illustrated in FIG. 6 corresponds to a case where the emergency operation part 40 as illustrated in FIG. 4 is used.

FIG. 6 (a) is a graph illustrating a change in a control signal output from the acceleration/deceleration switching switch 42c of the emergency operation part 40. An acceleration signal, a neutral signal, and a deceleration signal may be output from the acceleration/deceleration switching switch 42c and input to the inverter 20.

FIG. 6 (b) is a graph illustrating a change in a parking break signal generated by the inverter 20 and output to the mechanical brake 23. When the parking break signal is ON, the mechanical brake 23 mechanically puts a brake on the turning motor 21 and fixes the turning motor 21 to thereby fix the turning position of the upper turning motor 3.

FIG. 6 (c) is a graph illustrating a change in the turning speed of the upper turning body 3. The turning speed of the upper turning body 3 is proportional to the rotation speed of the turning motor 21 detected by the resolver 22. Thus, in an alternative example, the rotation speed of the turning motor 21 detected by the resolver 22 may be used instead of the turning speed of the upper turning body 3.

FIG. 6 (d) is a graph illustrating a change in a turning torque command value generated by the inverter 20. The value of a drive current to be supplied to the turning motor 21 is determined based on the turning torque command value, and the determined drive current is supplied from the inverter 20 to the turning motor 21.

To turn the upper turning body 3 by operating the emergency operation part 40, first, the ON-OFF switch 42a is operated to send an ON signal to the inverter 20. In this way, communication between the inverter 20 and the controller 30 may be blocked, and the inverter 20 may be arranged to be controllable by a control signal from the emergency operation part 40.

Then, as illustrated in FIG. 6 (a), at time t1, an acceleration signal output from the acceleration/deceleration switching switch 42c is turned ON. When the acceleration signal is turned ON, the inverter 20 turns OFF the parking brake signal and unlocks the brake applied by the mechanical brake 23. When the acceleration signal is turned ON at time t1, the inverter 20 generates a predetermined turning torque command value (positive value) and supplies a drive current according to the generated turning torque command value to the turning motor 21. The turning torque command value is maintained at a predetermined value. Thus, the turning motor 21 is driven by the drive current according to the predetermined turning torque command value and the rotation speed of the turning motor 21 starts to increase.

As illustrated in FIG. 6 (c), a speed limit (upper speed limit) is imposed on the turning speed of the upper turning body 3, and when the turning speed of the upper turning body 3 reaches the speed limit, the turning torque command value is reduced so that the turning speed may be prevented from exceeding the speed limit. That is, in an emergency, it is rather dangerous to rapidly turn the upper turning body 3. Thus, a limit is imposed on the turning speed so that the upper turning body 3 may be turned at a relatively low speed. Accordingly, when the turning speed reaches the speed limit at time t2, the turning torque command value is reduced, and the turning speed is prevented from becoming greater than the speed limit.

Next, when the operator switches the acceleration/deceleration switching switch 42c from the acceleration position to the neutral position, at time t3, the acceleration signal is turned OFF, and the neutral signal is turned ON. When the neutral signal is turned ON, the turning torque command value becomes zero and the value of the drive current supplied to the turning motor 21 becomes zero. Thus, the turning motor 21 rotates by inertia and the upper turning body 3 is turned only by inertial force so that its turning speed gradually decreases.

Next, when the operator switches the acceleration/deceleration switching switch 42c from the neutral position to the deceleration position, at time t4, the neutral signal is turned OFF, and the deceleration signal is turned ON. When the deceleration signal is turned ON, the inverter 20 generates a turning torque command value (negative value) and supplies a drive current according to the generated turning torque command value to the turning motor 21. The drive current supplied at this time is for rotating the turning motor 21 in the reverse direction. Thus, the turning motor 21 is driven in a decelerating direction by a drive current according to a predetermined turning torque command value so that the rotation speed of the turning motor 21 gradually decreases and the turning speed of the upper turning body 3 gradually decreases.

When the turning speed of the upper turning body 3 reaches zero and the upper turning body 3 comes to a halt, the operator switches the acceleration/deceleration switching switch 42c from the deceleration position to the neutral position. In this way, the deceleration signal is turned OFF, and the neutral signal is turned ON. When the neutral signal is turned ON, the turning torque command value becomes zero and the upper turning body 3 is maintained at a standstill.

When the turning speed of the upper turning body 3 remains substantially zero for a predetermined time period while the neutral signal is turned ON, at time t6, the inverter 20 turns ON the parking brake signal. In this way, the mechanical brake 23 puts a brake on the turning motor 21 so that the upper turning body 3 may be fixed in place at its stop position.

By operating the emergency operation part 40 as described above, the operator may turn the upper turning body 3 in a desired direction and have the upper turning body 3 stop at a desired position. Thus, even when the upper turning body 3 cannot be controlled due to the occurrence of an abnormality at the controller 30 or the control signal line 32, the operator may operate the emergency operation part 40 to turn the upper turning body 3 in a desired direction and stop the upper turning body at a desired position. Note that even when an abnormality occurs at the controller 30 or the control signal line 32, the engine control unit (ECU) 11b may not be experiencing any abnormality. Thus, the hydraulic motor 1A (for the right side) and the hydraulic motor 1B (for the left side) may be driven by the power of the engine 11. Accordingly, after operating the emergency operation part 40 to direct the upper turning body 3 in a predetermined direction, the operator may operate the operation unit 26 to move the excavator to a predetermined location.

Figure 7:
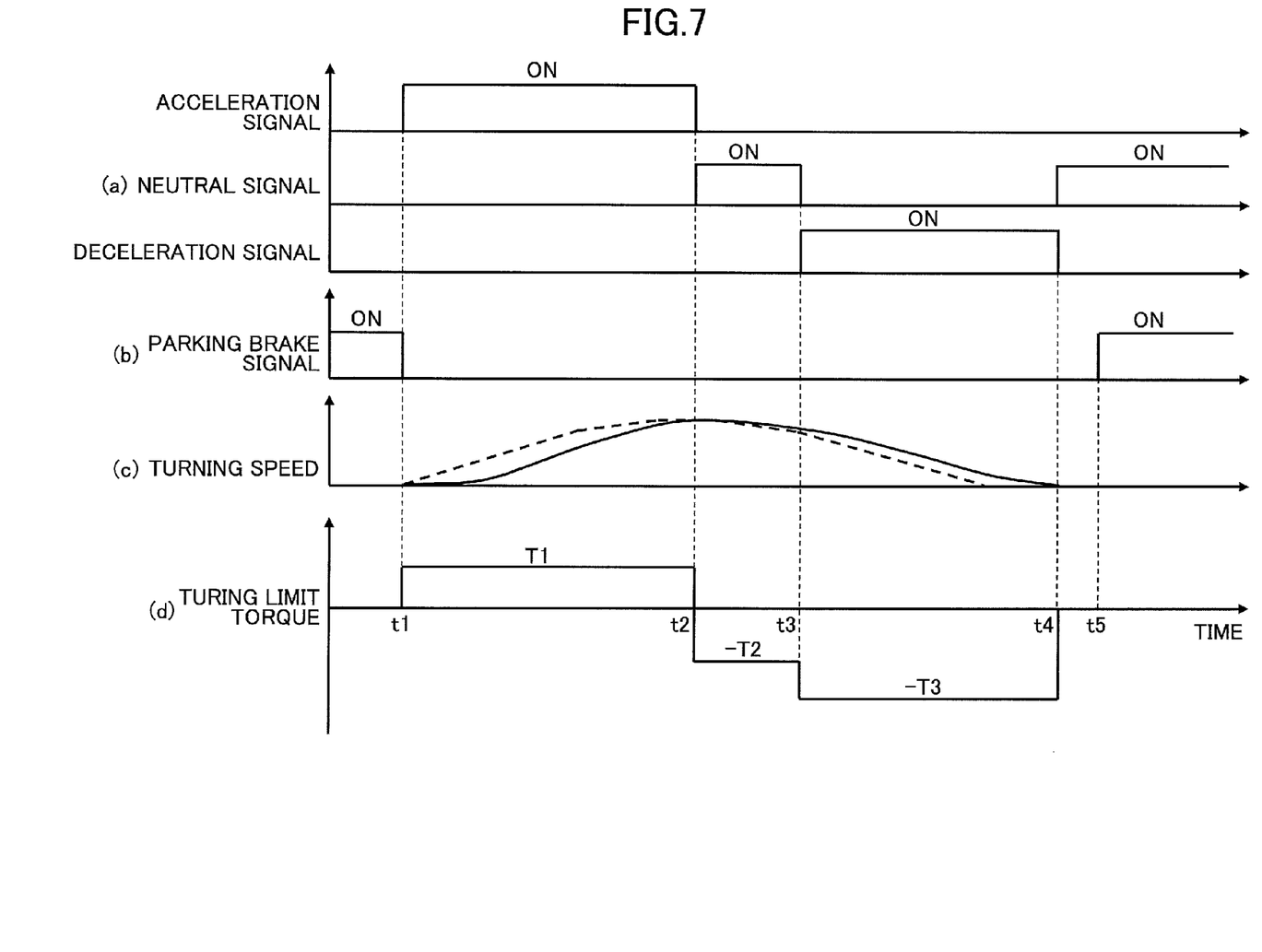
FIG. 7 is a time chart illustrating a change in each control element in another exemplary case of turning the upper turning body.

In the following, changes in control elements are described in another exemplary case where the emergency operation part 40 is operated to turn the upper turning body 3. FIG. 7 is a time chart illustrating another example of a change in each control element in a case where the emergency operation part 40 is operated to turn the upper turning body 3. The example illustrated in FIG. 7 corresponds to a case where the emergency operation part 40 as illustrated in FIG. 4 is used.

FIG. 7 (a) is a graph illustrating a change in a control signal output from the acceleration/deceleration switching switch 42c of the emergency operation part 40. An acceleration signal, a neutral signal, and a deceleration signal may be output from the acceleration/deceleration switching switch 42c and input to the inverter 20.

FIG. 7 (b) is a graph illustrating a change in a parking break signal generated by the inverter 20 and output to the mechanical brake 23. When the parking break signal is ON, the mechanical brake 23 mechanically puts a brake on the turning motor 21 and fixes the turning motor 21 to thereby fix the turning position of the upper turning motor 3.

FIG. 7 (c) is a graph illustrating a change in the turning speed of the upper turning body 3. The turning speed of the upper turning body 3 is proportional to the rotation speed of the turning motor 21 detected by the resolver 22. Thus, in an alternative example, the rotation speed of the turning motor 21 detected by the resolver 22 may be used instead of the turning speed of the upper turning body 3. In FIG. 7 (c), a turning speed command value is represented by a dotted line, and the corresponding actual turning speed detection value is represented by a solid line.

FIG. 7 (d) is a graph illustrating a change in a turning limit torque value for limiting the turning torque command value generated by the inverter 20. The turning torque command value is generated according to a speed deviation and is set up so as not to exceed the turning limit torque value. In this way, the value of a drive current to be supplied to the turning motor 21 is determined based on the turning torque command value generated by the inverter 20, and the determined drive current is supplied from the inverter 20 to the turning motor 21.

To turn the upper turning body 3 by operating the emergency operation part 40, first, the ON-OFF switch 42a is operated to send an ON signal to the inverter 20. In this way, communication between the inverter 20 and the controller 30 may be blocked, and the inverter 20 may be arranged to be controllable by a control signal from the emergency operation part 40.

Then, as illustrated in FIG. 7 (a), at time t1, an acceleration signal output from the acceleration/deceleration switching switch 42c is turned ON. When the acceleration signal is turned ON, the inverter 20 turns OFF the parking brake signal and unlocks the brake applied by the mechanical brake 23. When the acceleration signal is turned ON at time t1, the inverter 20 generates a turning torque command value (positive value) based on a predetermined time-speed pattern, and supplies a drive current according to the generated turning torque command value to the turning motor 21. The turning torque command value in the present example is set up so as not to exceed a predetermined turning limit torque T1. Thus, the turning motor 21 is driven by a drive current according to a predetermined turning torque command value and the rotation speed of the turning motor 21 starts to increase.

As illustrated in FIG. 7 (d), the change of the turning speed detection value is delayed with respect to the change of the turning speed command value. The turning torque command value is generated based on a deviation of the turning speed detection value from the turning speed command value and is limited by the turning limit torque value T1. That is, because it is dangerous to turn the upper turning body 3 at an excessively high speed, a limit is imposed on the turning torque command value so that the turning speed of the upper turning body 3 may be kept at a relatively low speed.

Next, when the operator switches the acceleration/deceleration switching switch 42c from the acceleration position to the neutral position, at time t2, the acceleration signal is turned OFF, and the neutral signal is turned ON. When the neutral signal is turned ON, the turning torque command value becomes zero and the value of the drive current supplied to the turning motor 21 becomes zero. Thus, the turning motor 21 rotates by inertia and the upper turning body 3 is turned only by inertial force so that its turning speed gradually decreases.

When the acceleration signal is turned OFF at time t2, the turning limit torque value is set equal to a negative value −T2 as illustrated in FIG. 7 (d). Because the turning torque command value is generated based on the speed deviation between the turning speed command value and the turning speed detection value, the turning torque command value may be a negative value even when the neutral signal is turned ON. Accordingly, the turning limit torque value is set equal to −T2 to impose a limit on the turning torque command value.

Next, when the operator switches the acceleration/deceleration switching switch 42c from the neutral position to the deceleration position, at time t3, the neutral signal is turned OFF, and the deceleration signal is turned ON. When the deceleration signal is turned ON, the inverter 20 generates a turning torque command value (negative value) and supplies a drive current according to the generated turning torque command value to the turning motor 21. The drive current supplied at this time is for rotating the turning motor 21 in the reverse direction. Thus, the turning motor 21 is driven in a decelerating direction by a drive current according to a turning torque command value determined based on a deviation between the turning speed command value and the turning speed detection value so that the rotation speed of the turning motor 21 gradually decreases and the turning speed of the upper turning body 3 gradually decreases. At this time, the turning limit torque value for limiting the turning torque command value is set equal to −T3. The absolute value of the turning torque command value −T3 during deceleration is preferably arranged to be greater than the turning limit torque value T1 during acceleration. This is because deceleration of the upper turning body 3 may be more abrupt than acceleration.

When the turning speed of the upper turning body 3 reaches zero and the upper turning body 3 comes to a halt, the operator switches the acceleration/deceleration switching switch 42c from the deceleration position to the neutral position. In this way, the deceleration signal is turned OFF, and the neutral signal is turned ON. When the neutral signal is turned ON, the turning torque command value becomes zero and is maintained at zero so that the upper turning body 3 is maintained at a standstill.

When the turning speed of the upper turning body 3 remains substantially zero for a predetermined time period while the neutral signal is turned ON, at time t5, the inverter 20 turns ON the parking brake signal. In this way, the mechanical brake 23 puts a brake on the turning motor 21 so that the upper turning body 3 may be fixed in place at its stop position.

The above pattern of change in the turning limit torque value (i.e., pattern of change from T1 during acceleration to −T2 during a neutral state, and −T3 during deceleration) may be stored as map information in a memory 20a of the inverter 20 (see FIG. 2). Thus, the inverter 20 may refer to the map information stored in the memory 20a to determine the turning torque command value based on a control signal from the emergency operation part 40. Alternatively, the map information may be stored in a memory 40a of the emergency operation part 40 and may be transmitted to the inverter 20 along with the control signal, for example.

Note that in a case where the excavator itself is stationed at a sloped area, a turning plane of the upper turning body 3 may be tilted as well. Accordingly, in a preferred embodiment, a turning force for turning the upper turning body 3 is changed according to the direction in which the upper turning body 3 is turned. That is, in the case where the excavator is tilted and the upper turning body 3 is turned in a direction that involves raising the boom 4 (see FIG. 1) attached to the upper turning body 3 to a higher position, a greater amount of turning force is required compared to a case where the excavator is on level ground. On the other hand, in the case where the excavator is tilted and the upper turning body 3 is turned in a direction that involves lowering the boom 4 to a lower position, a smaller amount of turning force is required compared to the case where the excavator is on level ground. Thus, with regard to the example illustrated in FIG. 7, the turning limit torque value for limiting the turning torque command value is preferably changed according to the tilt angle of the excavator.

Figure 8:
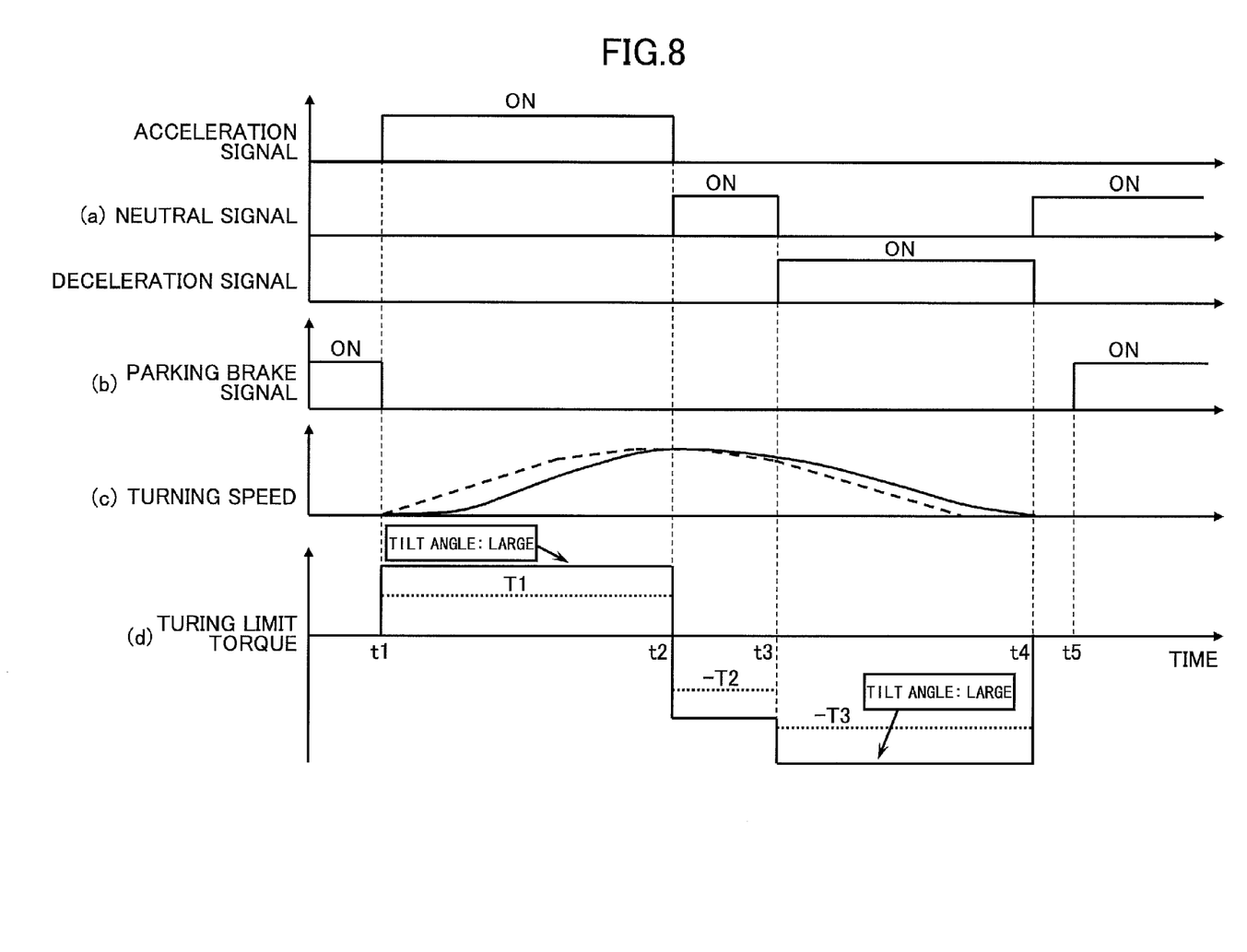
FIG. 8 is a time chart illustrating a change of each control element in another exemplary case of turning the upper turning body.

In this respect, FIG. 8 illustrates an example in which the turning limit torque value is changed according to the tilt angle of the excavator. Note that graphs (a), (b), and (c) of FIG. 8 are identical to the graphs (a), (b), and (c) of FIG. 7 so that descriptions thereof are omitted. As illustrated in FIG. 8 (*d*), when the tilt angle of the excavator is large and the upper turning body 3 is turned in a direction that requires the boom 4 to be raised to a higher position, the turning limit torque value is set equal to a value greater than T1 so that the turning speed of the upper turning body 3 may be accelerated with greater force. Also, when the tilt angle of the excavator is large and the upper turning body 3 is turned in a direction that requires the boom 4 to be lowered to a lower position, the turning limit torque value is set equal to a value having a greater absolute value than −T2 or −T3 so that the turning speed of the upper turning body 3 may be decelerated with greater force.

To enable such adjustment of the turning limit torque value, multiple sets of map information according to the tilt angle of the excavator may be prepared and stored in the memory 20*a* or the memory 40*a*, for example. The inverter 20 may refer to map information corresponding to the tilt angle based on tilt angle information from the tilt sensor 50 and determine the turning limit torque value accordingly.

Although the present invention is described above with reference to illustrative embodiments of a hybrid excavator, the present invention is not limited to the embodiments described above, and numerous variations and modifications may be made without departing from the scope of the present invention.

What is claimed is:

1. A turning drive device that converts power of an engine into electric power and turns a turning body using the converted electric power, the turning drive device comprising:
   an operation unit including an operation lever for the turning body;
   an electrical energy storage unit that stores electrical energy;
   a turning motor that is driven by an electric power from the electrical energy storage unit and is configured to drive the turning body;
   an inverter that controls a drive operation of the turning motor;
   a controller that is connected to the inverter via a control signal line and that is configured to operate the turning motor by generating a speed command according to an input of the operation lever for the turning body and by outputting a command to the inverter; and
   an emergency operation part that is provided separately from the operation lever and is configured to operate the turning motor by outputting another command to the inverter;
   wherein the emergency operation part is configured to be operable when an abnormality occurs in a control operation of the turning motor by the controller.

2. The turning drive device as claimed in claim 1, wherein at least one of the emergency operation part and the inverter includes a storage part that stores a map for determining a current value to be supplied to the turning motor.

3. The turning drive device as claimed in claim 1, further comprising:
   a mechanical brake that puts a mechanical brake on the turning motor;
   wherein an operation of the mechanical brake is controlled by the emergency operation part.

4. The turning drive device as claimed in claim 2, wherein the storage part stores a plurality of the maps to determine the current value according to a tilt angle detected by a tilt sensor.

5. The turning drive device as claimed in claim 1, wherein the emergency operation part includes a selection switch for selecting between right turning and left turning.

\* \* \* \* \*